(12) United States Patent
Sundy et al.

(10) Patent No.: US 8,755,669 B2
(45) Date of Patent: Jun. 17, 2014

(54) SPLICING SYSTEM

(75) Inventors: Len Sundy, Ramat Beit Shemesh (IL); Yair Mirsky, Jerusalem (IL); Ariel Zentner, Allon (IL); Yael Weinbach, Jerusalem (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 13/138,096

(22) PCT Filed: Apr. 8, 2010

(86) PCT No.: PCT/IB2010/051528
§ 371 (c)(1),
(2), (4) Date: Aug. 8, 2011

(87) PCT Pub. No.: WO2010/131128
PCT Pub. Date: Nov. 18, 2010

(65) Prior Publication Data
US 2012/0099022 A1    Apr. 26, 2012

Related U.S. Application Data

(60) Provisional application No. 61/216,071, filed on May 13, 2009.

(51) Int. Cl.
*H04N 9/80* (2006.01)
*H04N 5/76* (2006.01)
*H04N 5/93* (2006.01)

(52) U.S. Cl.
USPC ........... 386/239; 386/235; 386/248; 386/249; 386/357

(58) Field of Classification Search
USPC .................. 386/239–251, 291–299, 353–357
See application file for complete search history.

(56) References Cited

U.S. PATENT DOCUMENTS 5,724,091 A    3/1998   Freeman et al.
5,917,830 A    6/1999   Chen et al.
(Continued)

FOREIGN PATENT DOCUMENTS

WO    WO 99/30493    6/1999
WO    WO 00/69163    11/2000
(Continued)

OTHER PUBLICATIONS

Jul. 14, 2010 Transmittal of International Search Report and Written Opinion of International Searching Authority for PCT/IB2010/051528.
(Continued)

*Primary Examiner* — Hung Dang
(74) *Attorney, Agent, or Firm* — Husch Blackwell LLP

(57) ABSTRACT

A system for switching from a first (14) to a second (16) audio/video sequence, the second sequence (16) including a splice point time stamp (12), the system including a disk (18) to store the first sequence (14), a receiver to receive the second sequence as live audio/video, a demultiplexer arrangement (24) to demultiplex at least some of the first sequence (14) from the disk (18) and the second sequence (16) from the receiver, demultiplex the first sequence fast enough so that the demultiplexing of the second sequence (16) can commence a number of frames prior to the splice point time stamp (12), a buffer (28,30) to receive for storage from the demultiplexer arrangement (24), the demultiplexed audio/video of the first sequence (14) and at least part of the second sequence (16), and a decoder (34,36) to decode the demultiplexed audio/video stored in the buffer (28,30) including decoding the first sequence (14) and then the second sequence (16) from the splice point time stamp (12). Related apparatus and methods are also described.

6 Claims, 14 Drawing Sheets

(56) References Cited

U.S. PATENT DOCUMENTS

| | | | |
|---|---|---|---|
| 7,068,719 B2 | 6/2006 | Liu et al. | |
| 2004/0160974 A1* | 8/2004 | Read et al. | 370/431 |
| 2005/0238320 A1* | 10/2005 | Shultz | 386/46 |
| 2006/0253864 A1 | 11/2006 | Easty | |
| 2007/0110393 A1* | 5/2007 | Jang | 386/83 |
| 2007/0136742 A1 | 6/2007 | Sparrell | |
| 2008/0104657 A1 | 5/2008 | Furukawa | |
| 2008/0313669 A1 | 12/2008 | Acharya et al. | |
| 2012/0023543 A1* | 1/2012 | Shelton et al. | 725/134 |

FOREIGN PATENT DOCUMENTS

| | | |
|---|---|---|
| WO | WO 02/100110 A2 | 12/2002 |
| WO | WO 2005/001626 A2 | 1/2005 |

OTHER PUBLICATIONS

Norm Hurst et al., "MPEG Splicing: A New Standard for Television—SMPTE 312M," *SMPTE Journal*, (Nov. 1998, pp. 978-988).

L. Wang et al., "A Method of Accurate DTV Transport Streams Splicing," (IEEE 2006).

S. Merrill Weiss, "Switching Facilities in MPEG-2: Necessary but Not Sufficient," *SMPTE Journal* (Dec. 1995, pp. 788-802).

Mar. 21, 2013 Office Communication in connection with AU 2010 247117.

May 13, 2013 Office Communication in connection with prosecution of CN 2010 8001 1054.8 ( with English translation).

Dec. 18, 2013 Office Communication in connection with prosecution of CN 2010 800 11054.8 (w/English translation).

* cited by examiner

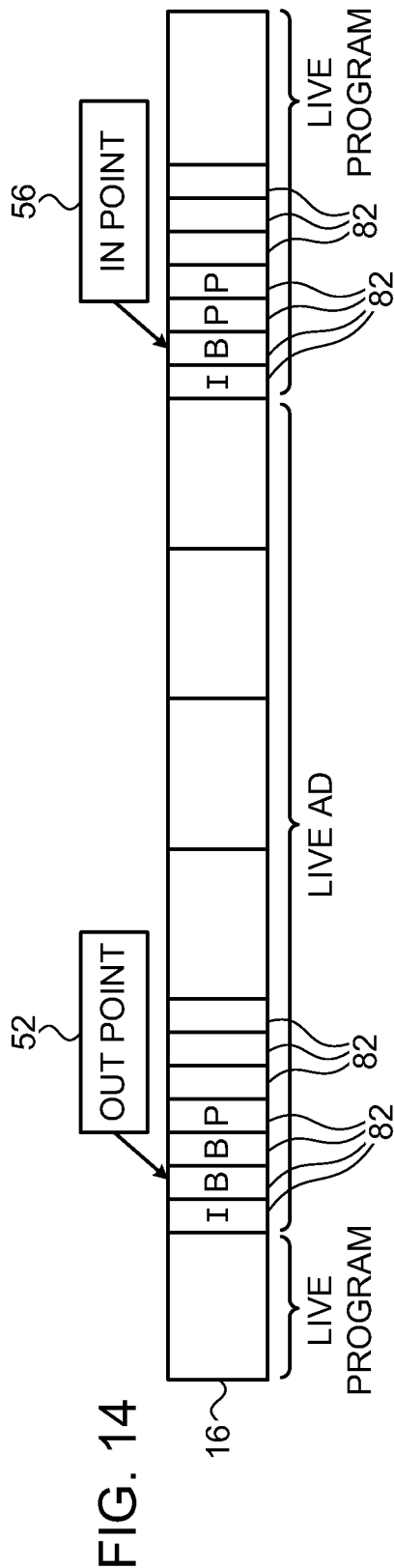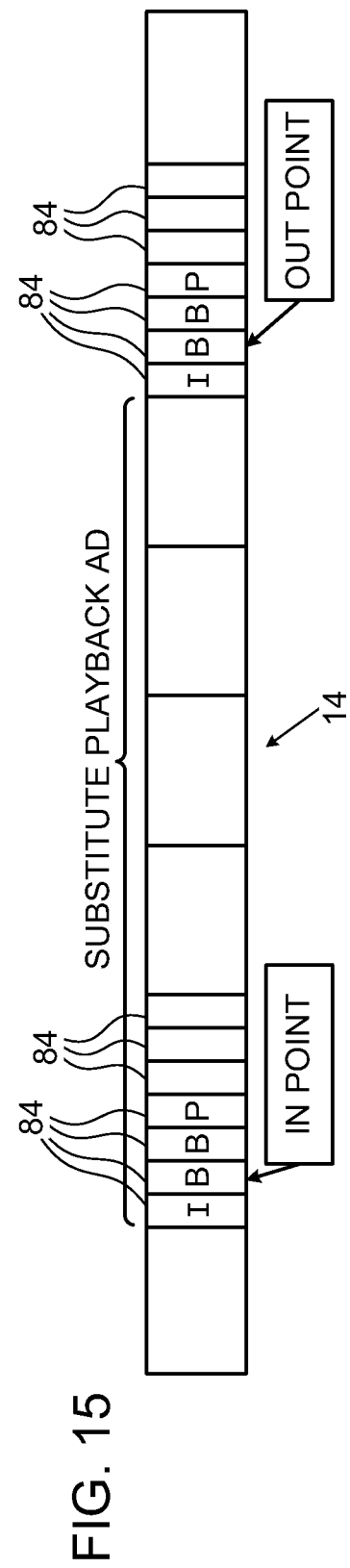

SPLICING SYSTEM

The present application is a 35USC §371 application of PCT/AB2010/051528, filed on 8 Apr. 2010 and entitled "Splicing System", which was published on 18 Nov. 2010 in the English language with International Publication Number WO 2010/131128 and which relies for priority on U.S. Provisional Patent Application Ser. No. 61/216,071 of Sundy, et al., filed 13 May 2009.

SUMMARY OF THE INVENTION

The present invention, in certain embodiments thereof, seeks to provide an improved splicing system.

The present invention, in certain embodiments thereof, provides seamless splicing of video and/or audio streams in a single video decoder and/or single audio decoder environment.

There is thus provided in accordance with an embodiment of the present invention a system for switching from a first audio/video sequence to a second audio/video sequence, the second audio/video sequence including a splice point time stamp, the system including a plurality of operationally connected elements including a disk to store content therein including the first audio/video sequence, a live receiver to receive the second audio/video sequence as live audio/video, a demultiplexer arrangement to demultiplex, at least some of the first audio/video sequence from the disk and at least some of the second audio/video sequence from the live receiver, the demultiplexer arrangement being operative to demultiplex the first audio/video sequence fast enough so that the demultiplexing of the second audio/video sequence can commence a number of frames prior to the splice point time stamp, a buffer to receive for storage therein from the demultiplexer arrangement, the demultiplexed audio/video of the first audio/video sequence and at least part of the second audio/video sequence, and a decoder to decode the demultiplexed audio/video stored in the buffer including decoding the first audio/video sequence and then decoding the second audio/video sequence from the splice point time stamp.

Further in accordance with an embodiment of the present invention the demultiplexed audio/video of the second audio/video sequence includes unwanted data, the unwanted data being from the number of frames prior to the splice point time stamp until before the splice point time stamp, and the buffer is operative to discard the unwanted data of the second audio/video sequence so that the decoder does not receive the unwanted data for decoding.

Still further in accordance with an embodiment of the present invention, the system includes a pre-filter disposed between the demultiplexer arrangement and the buffer, the pre-filter being operative to receive, from the demultiplexer arrangement, the demultiplexed audio/video of the first audio/video sequence and the second audio/video sequence, the demultiplexed audio/video of the second audio/video sequence including unwanted data, the unwanted data being from the number of frames prior to the splice point time stamp until before the splice point time stamp, and wherein the buffer is operative to receive for storage therein, the demultiplexed audio/video from the pre-filter including demultiplexed audio/video of the first audio/video sequence and the second audio/video sequence excluding the unwanted data filtered out by the pre-filter.

There is also provided in accordance with still another embodiment of the present invention a system for switching from a first audio/video sequence to a second audio/video sequence at a pre-determined splice point time stamp, the pre-determined splice point time stamp being received from a broadcast Headend, the system including a plurality of operationally connected elements including a demultiplexer arrangement to demultiplex at least some of the first audio/video sequence and at least some of the second audio/video sequence, demultiplexing of the second audio/video sequence commencing a number of frames prior to the pre-determined splice point time stamp, a buffer to receive for storage therein from the demultiplexer arrangement, the demultiplexed audio/video of the first audio/video sequence and the second audio/video sequence, the demultiplexed audio/video of the second audio/video sequence including unwanted data, the unwanted data being from the number of frames prior to the pre-determined splice point time stamp until before the pre-determined splice point time stamp, and a decoder to decode the demultiplexed audio/video stored in the buffer including decoding the first audio/video sequence and then decoding the second audio/video sequence from the pre-determined splice point time stamp, wherein the buffer is operative to discard the unwanted data of the second audio/video sequence so that the decoder does not receive the unwanted data for decoding.

There is also provided in accordance with still another embodiment of the present invention a system for switching from a first audio/video sequence to a second audio/video sequence, the second audio/video sequence including a splice point time stamp, the system including a plurality of operationally connected elements including a demultiplexer arrangement to demultiplex at least some of the first audio/video sequence and at least some of the second audio/video sequence, demultiplexing of the second audio/video sequence commencing a number of frames prior to the splice point time stamp, a pre-filter to receive, from the demultiplexer arrangement, the demultiplexed audio/video of the first audio/video sequence and the second audio/video sequence, the demultiplexed audio/video of the second audio/video sequence including unwanted data, the unwanted data being from the number of frames prior to the splice point time stamp until before the splice point time stamp, a buffer to receive for storage therein, the demultiplexed audio/video from the pre-filter including demultiplexed audio/video of the first audio/video sequence and the second audio/video sequence excluding the unwanted data filtered out by the pre-filter, the pre-filter being disposed between the demultiplexer arrangement and the buffer, and a decoder to decode the demultiplexed audio/video stored in the buffer including decoding the first audio/video sequence and then decoding the second audio/video sequence from the time stamp.

Additionally in accordance with an embodiment of the present invention the decoder is operative to seamlessly splice between decoding of the first audio/video sequence and the second audio/video sequence such that there will be no noticeable listening/viewing gap between the first audio/video sequence and the second audio/video sequence.

Moreover in accordance with an embodiment of the present invention the demultiplexer arrangement includes a first demultiplexer and a second demultiplexer, the first demultiplexer being operative to demultiplex the first audio/video sequence, the second demultiplexer being operative to demultiplex the second audio/video sequence.

There is also provided in accordance with still another embodiment of the present invention a method for switching from a first audio/video sequence to a second audio/video sequence at a pre-determined splice point time stamp, the method including receiving the pre-determined splice point time stamp from a broadcast Headend, demultiplexing at least some of the first audio/video sequence and at least some of the second audio/video sequence, the demultiplexing of the second audio/video sequence commencing a number of frames prior to the pre-determined splice point time stamp, the demultiplexed audio/video of the second audio/video sequence including unwanted data, the unwanted data being from the number of frames prior to the pre-determined splice point time stamp until before the pre-determined splice point time stamp, discarding the unwanted data of the second audio/video sequence so that the unwanted data is not decoded, decoding the first audio/video sequence, and then decoding the second audio/video sequence from the pre-determined splice point time stamp.

There is also provided in accordance with still another embodiment of the present invention a method for switching from a first audio/video sequence to a second audio/video sequence, the second audio/video sequence including a splice point time stamp, the method including demultiplexing at least some of the first audio/video sequence from a disk and at least some of the second audio/video sequence from a live receiver, the demultiplexing of the first audio/video sequence being fast enough so that the demultiplexing of the second audio/video sequence can commence a number of frames prior to the splice point time stamp, decoding the first audio/video sequence, and then decoding the second audio/video sequence from the splice point time stamp.

Further in accordance with an embodiment of the present invention the decoding seamlessly splices between decoding of the first audio/video sequence and the second audio/video sequence such that there will be no noticeable listening/viewing gap between the first audio/video sequence and the second audio/video sequence.

There is also provided in accordance with still another embodiment of the present invention a system including a plurality of operationally connected elements including a disk to store content therein including a first audio/video sequence, a live receiver to receive a live stream including a second audio/video sequence, and data including a plurality of entitlement control messages and/or interactive application data, a first demultiplexer arrangement to demultiplex at least some of the first audio/video sequence from the disk, a second demultiplexer to demultiplex at least some of the second audio/video sequence from the live receiver, and to filter, for use by the system, the entitlement control messages and/or the interactive application data, a buffer to receive for storage therein the demultiplexed audio/video of the first audio/video sequence from the first demultiplexer and at least part of the second audio/video sequence from the second demultiplexer, the buffer being operative to receive output either from the first demultiplexer or the second demultiplexer at any one time, wherein, for at least part of the time when the buffer is receiving output from the first demultiplexer, the second demultiplexer is still operative to filter, for use by the system, the entitlement control messages and/or the interactive application data from the live stream even though the second audio/video sequence is not being filtered by the second demultiplexer, and a decoder to decode the demultiplexed audio/video stored in the buffer.

There is also provided in accordance with still another embodiment of the present invention a system for switching from a first audio/video sequence to a second audio/video sequence at a splice point time stamp, the system including a plurality of operationally connected elements including a demultiplexer arrangement to demultiplex at least some of the first audio/video sequence, a buffer to receive for storage therein from the demultiplexer arrangement, the demultiplexed audio/video of the first audio/video sequence, a middleware to control the elements, a decoder driver to detect when the splice point time stamp enters the buffer, and send a notification to the middleware when the spice point time stamp enters the buffer, wherein the middleware is operative to receive the notification, and then based on the notification, switch from outputting the first audio/video sequence to outputting at least part of the second audio/video sequence to the buffer, the demultiplexer arrangement being operative to demultiplex at least some of the second audio/video sequence, demultiplexing of the second audio/video sequence commencing a number of frames prior to the splice point time stamp, and the buffer being operative to receive for storage therein from the demultiplexer arrangement the at least part of the second audio/video sequence, and a decoder to decode the demultiplexed audio/video stored in the buffer including decoding the first audio/video sequence and then decoding the second audio/video sequence from the pre-determined splice point time stamp.

BRIEF DESCRIPTION OF THE DRAWINGS

The present invention will be understood and appreciated more fully from the following detailed description, taken in conjunction with the drawings in which:

FIG. 14 is a partly pictorial, partly block diagram view of live video frames in the system of FIG. 1; and FIG. 15 is a partly pictorial, partly block diagram view of recorded video frames in the system of FIG. 1.

DETAILED DESCRIPTION OF AN EMBODIMENT

Figure 1:
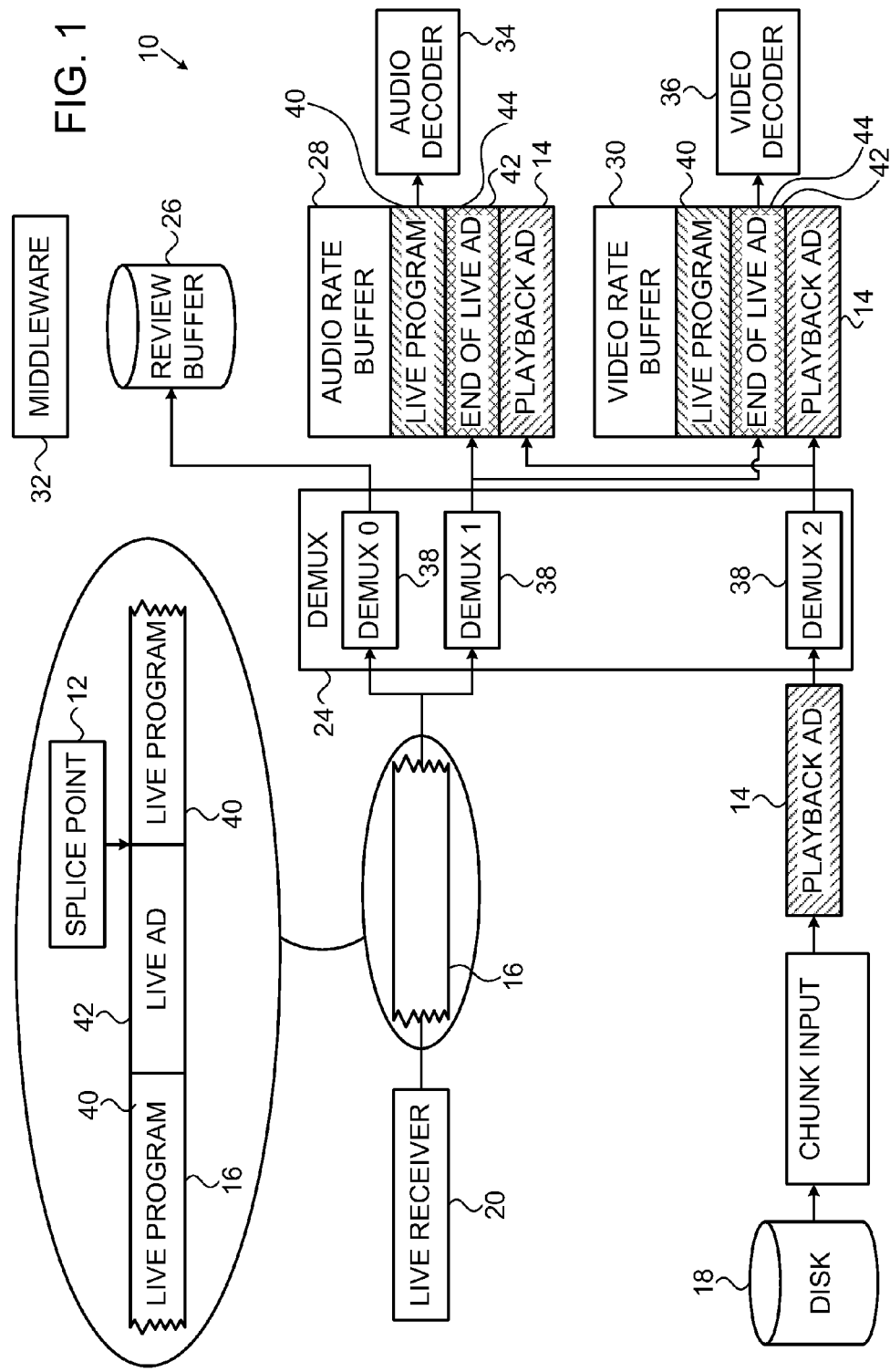
FIG. 1 is a partly pictorial, partly block diagram view of a splicing system constructed and operative in accordance with an embodiment of the present invention.

Reference is now made to FIG. 1, which is a partly pictorial, partly block diagram view of a splicing system 10 constructed and operative in accordance with an embodiment of the present invention.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example: encoded, but neither scrambled nor encrypted; compressed, but neither scrambled nor encrypted; scrambled or encrypted, but not encoded; scrambled or encrypted, but not compressed; encoded, and scrambled or encrypted; or compressed, and scrambled or encrypted.

Likewise, the terms "decoded" and "decompressed" one the one hand, and the terms "descrambled" and "decrypted" on the other hand, are used to refer to different and exclusive types of processing.

Persons skilled in the art will appreciate that, throughout the present application, a set-top box is used by way of example only, and that the present invention is not limited to a particular type of content rendering device, but rather includes any suitable device.

Persons skilled in the art will appreciate that, throughout the present application, a substitute advertisement is used by way of example only, and that the present invention is not limited to a particular type of substitute content, but rather includes any suitable substitute content.

The splicing system 10 typically includes a plurality of operationally connected elements including a live receiver 20, a disk 18, a demultiplexer arrangement 24, a review buffer 26, an audio rate buffer 28, a video rate buffer 30, a collection of middleware 32, a single audio decoder 34 and a single video decoder 36.

The live receiver 20 is operative to receive a live stream 16 including live audio and/or video. The live stream 16 typically includes other data, for example, but not limited to, program specific information (PSI), service information (SI), entitlement control messages (ECMs), entitlement management messages (EMMs) and interactive application (iApp) data. The live receiver 20 typically includes a tuner (not shown) and a demodulator (not shown). The configuration of the live receiver 20 generally depends on the way that the live stream 16 is communicated to the live receiver 20, for example, but not limited to, from a broadcast Headend via satellite, cable, Internet Protocol and/or terrestrial communications. The live stream 16 generally includes a plurality of live programs 40 and live advertisements 42.

The disk 18 is typically used to store any suitable content therein, including the substitute advertisement(s) 14 and recording(s) of the live programs 40 and the live advertisements 42.

The demultiplexer arrangement 24 typically includes one or more demultiplexers 38 (DEMUX0, DEMUX1 and DEMUX2) for demultiplexing audio and/or video streams. DEMUX0 is typically operative to filter audio and/or video data of the live stream 16 for storage in the review buffer 26, as described in more detail below. DEMUX1 is typically operative to demultiplex the live stream 16 audio/video sequence, as required, including filtering of the program specific information (PSI), service information (SI), entitlement control messages (ECM), entitlement management messages (EMM), interactive application (iApp) data from the live stream 16 for use by the splicing system 10. DEMUX2 is typically operative to demultiplex the substitute advertisement 14 audio/video sequence.

The review buffer 26 is a storage device which is typically operative to store the live stream 16 on an ongoing basis such that a viewer may replay the stored live stream 16 using "trick modes" or "trick play". When the review buffer 26 is full or nearly full, the oldest content is typically deleted to make space to store new content.

The audio rate buffer 28 and the video rate buffer 30 store the content demultiplexed by the demultiplexer arrangement 24 prior to decoding by the audio decoder 34 and the video decoder 36, respectively. The buffers 28, 30 are typically operative to receive output from either DEMUX1 or DEMUX2 at any one time.

The middleware 32 is typically operative to control and coordinate the operation of the various elements of the splicing system 10.

By way of introduction, in legacy set-top boxes (STBs) where only a single video decoder is available, stopping decoding one stream in order to start decoding another stream generally leads to a short period of blank screens or freeze frames in the presentation of video by the STB on a display device (not shown). In other words, the splicing between one stream and another is not a seamless process.

As described above, the live stream 16 includes live programs 40 and live advertisements 42. The live advertisement(s) 42 may be replaced by the substitute advertisement 14. The description that follows describes switching back from the substitute advertisement 14 to the live stream 16 at the end of the substitute advertisement 14.

In accordance with an embodiment of the present invention, splice points 12 in the presentation domain are typically signaled via presentation time stamps (PTSs). The splice points 12 are typically pre-determined at the content provider, for example, but not limited to, the broadcast Headend. The pre-determined splice points 12 are typically included in the live stream 16 or another suitable stream, for example, but not limited to, a metadata stream. The splice points 12 are typically received by the live receiver 20. When switching back from a piece of content, such as the substitute advertisement 14, to the live stream 16, the live stream 16 needs to be buffered somewhat prior to the switch back splice point 12 in order to ensure that all relevant packets in the live stream 16 are buffered for decoding. It will be appreciated by those ordinarily skilled in the art that any suitable timecode or time stamp may be used instead of PTSs.

Say that live listening/viewing has to resume from time t in the display domain, then in the compressed domain the packets corresponding to the display at time t are a number of frames, for example, but not limited to, 20 frames, prior to time t. It should be noted that the term "display domain" can also be understood with reference to audio output.

When playing back the substitute advertisement 14 from the disk 18, the substitute advertisement 14 is pushed through the demultiplexer arrangement 24 faster than real-time until there is no further data that needs to be read from the disk 18 for the substitute advertisement 14. The data of the substitute advertisement 14 is available in the rate buffers 28, 30 for decoding by the audio decoder 34 and the video decoder 36, respectively. Therefore, the rate buffers 28, 30 can now be receive data from DEMUR 1 to enable reception of the live stream 16 sufficiently early as described above.

So while the data of the substitute advertisement 14 is being decoded from the rate buffers 28, 30, the live stream 16 is being demultiplexed into the rate buffers 28, 30 from a number of frames prior to time t or earlier, so as to allow a seamless switch from the substitute advertisement 14 to the live stream 16 at time t.

Therefore, the demultiplexer arrangement 24 is typically operative to demultiplex the substitute advertisement 14 from the disk 18 and the live stream 16 from the live receiver 20, as required, yielding demultiplexed audio/video of the audio/video sequence of the substitute advertisement 14 and the audio/video sequence of the live stream 16, respectively. The demultiplexer arrangement 24 is typically operative to demultiplex the audio/video sequence of the substitute advertisement 14 fast enough so that the demultiplexing of the audio/video sequence of the live stream 16 can commence a number of frames prior to the splice point time stamp 12.

The rate buffers 28, 30 are typically operative to receive from the demultiplexer arrangement 24 for storage therein, the demultiplexed audio/video of: the substitute advertisement 14; and at least part of the live stream 16.

It will be appreciated by those ordinarily skilled in the art that the rate buffers 28, 30 typically have sufficient capacity to store the required data of the substitute advertisement 14 and the live stream 16 audio/video sequences. The rate buffers 28, 30 are typically larger than buffers normally used for decoding live broadcasts. The rate buffers 28, 30 are also known as audio/video bit buffers or compressed picture buffers or decoder buffers for use between the demultiplexer arrangement 24 and the decoders 34, 36.

The demultiplexed audio/video of the live stream 16 audio/video sequence typically includes unwanted data 44 such as, the end of the live advertisement 42, as well as wanted live data of the live program 40 (after the live advertisements 42). The unwanted data 44 is from a number of frames prior to the splice point time stamp 12 until before the splice point time stamp 12, typically until one video/audio frame prior to the splice point 12.

In other words, as some of the buffered packets relate to live content (for example, the live advertisements 42 in the live stream 16) that precedes the splice point 12 in terms of PTS, the packets of the unwanted data 44 need to be filtered out from the rate buffers 28, 30 and not decoded. The filtering out may be performed by deleting/discarding packets from the rate buffers 28, 30 based on time stamp (for example, but not limited to, PTS) or by the decoder only selecting packets with particular time stamps (for example, but not limited to, PTSs) by way of example only. It will be appreciated by those ordinarily skilled in the art that the filtering out will depend upon the constraints of the system 10.

Therefore, the rate buffers 28, 30 are operative to discard the unwanted data 44 of the live stream 16 audio/video sequence so that the decoders 34, 36 do not receive the unwanted data 44 for decoding.

The decoders 34, 36 are operative to seamlessly splice between decoding the audio/video sequence of the substitute advertisement 14 and the audio/video sequence of the live stream 16 such that there will be no noticeable listening/viewing gap between the audio/video sequence of the substitute advertisement 14 and the audio/video sequence of the live stream 16.

Implementation of the splicing system 10 is typically easier when the splice points are at random access points and group of pictures (GOPs) are closed. However, it will be appreciated by those ordinarily skilled in the art that the splicing system 10 may be implemented even when the splice points are not at random access points (RAPS) and/or the GOPs are not closed.

The above description describes transitioning from the substitute advertisement 14 to the live stream 16. It will be appreciated by those ordinarily skilled in the art that above scenario regarding the unwanted data 44 may be applied to a live to disk transition or a disk to disk transition as will be described below with reference to FIGS. 1-15. For example, the unwanted data 44 may exist in a live to disk transition and/or a disk to disk transition.

Pushing an audio/video sequence through the demultiplexer arrangement 24 faster than real-time is particularly useful for a disk to live transition. However, it will be appreciated by those ordinarily skilled in the art that an audio/video sequence may be pushed through the demultiplexer arrangement 24 faster than real-time in a disk to disk transition.

In general, the splicing system 10 is operative to switch from decoding a first audio/video sequence (for example, but not limited to, the substitute advertisement 14 or any other suitable audio and/or video sequence) to decoding a second audio/video sequence (for example, but not limited to, the live stream 16 or any other suitable audio and/or video sequence) or vice versa.

For at least part of the time, and typically all of the time, while the buffers 28, 30 are receiving output from DEMUX2, DEMUX1 is still operative to filter, for use by the system 10, the program specific information (PSI) and/or the service information (SI) and/or the entitlement control messages (ECMs) and/or the entitlement management messages (EMMs) and/or the interactive application (iApp) data from the live stream 16, even though the audio/video sequence of the live stream 16 is not being filtered by DEMUX1 during this time.

The middleware 32 is typically operative to control the demultiplexer arrangement 24, the audio rate buffers 28, 30 and the decoders 34, 36 and in particular the switching output between DEMUX1 and DEMUX2, the speed of demultiplexing, and the discarding/purging data from the rate buffers 28, 30.

FIGS. 2-15 only show a single rate buffer and single decoder for the sake of simplicity. The single rate buffer and single decoder may represent: the audio rate buffer 28 and the audio decoder 34; and/or the video rate buffer 30 and the video decoder 36.

Figure 2:
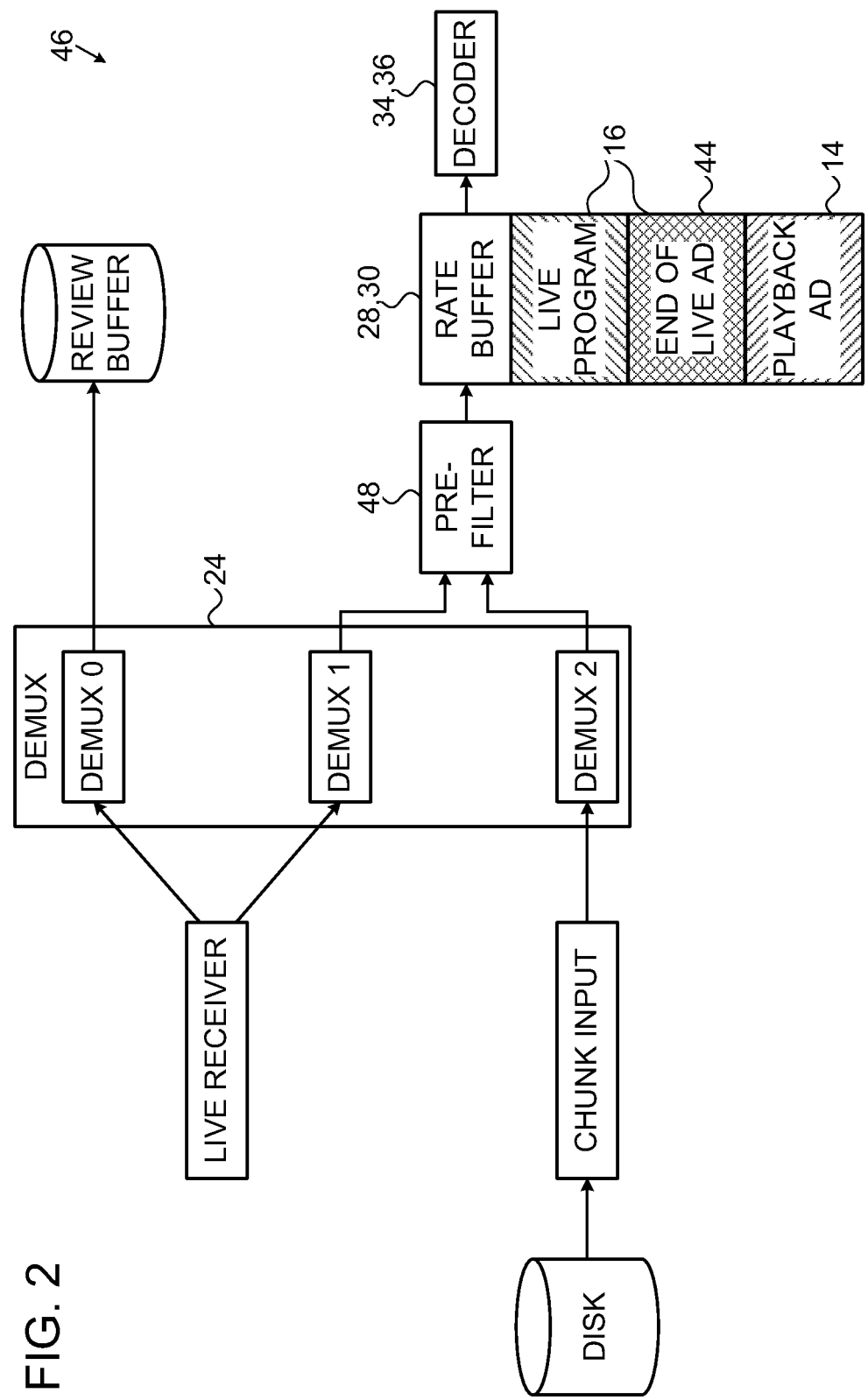
FIG. 2 is a partly pictorial, partly block diagram view of a splicing system constructed and operative in accordance with an alternative embodiment of the present invention.

Reference is now made to FIG. 2, which is a partly pictorial, partly block diagram view of a splicing system 46 constructed and operative in accordance with an alternative embodiment of the present invention.

The splicing system 46 is substantially the same as the splicing system 10 except that the splicing system 46 includes a pre-filter 48.

In overview, the unwanted data 44 is filtered out by the pre-filter 48, generally based on time stamps (such as PTSs). The pre-filter 48 is typically disposed after the demultiplexer arrangement 24 and before the rate buffers 28, 30 such that the packets of the unwanted data 44 packets do not even arrive at the rate buffers 28, 30.

The decoders 34, 36 are then able to start decoding the live stream 16 from time t.

Therefore, the pre-filter 48 is typically operative to receive, from the demultiplexer arrangement 24, the demultiplexed audio/video sequence of: the substitute advertisement 14; and the live stream 16. The live stream 16 audio/video sequence typically includes the unwanted data 44.

The pre-filter 48 is operative to filter out the unwanted data 44 such that the rate buffers 28, 30 are operative to receive for storage therein, the demultiplexed audio/video from the pre-filter 48 including demultiplexed audio/video of the audio/video sequence of the substitute advertisement 14 and the demultiplexed audio/video of the audio/video sequence of the live stream 16, but excluding the unwanted data 44 filtered out by the pre-filter 48.

In general, the splicing system 46 is operative to switch from decoding a first audio/video sequence (for example, but not limited to, the substitute advertisement 14 or any other suitable audio and/or video sequence) to decoding a second audio/video sequence (for example, but not limited to, the live stream 16 or any other suitable audio and/or video sequence) or vice versa.

Reference is again made to FIG. 1.

It will be appreciated by those ordinarily skilled in the art that the splicing system 10 and the splicing system 46 (FIG. 2) may be implemented based on any suitable video broadcasting standard, for example, but not limited to, DSS or MPEG-2.

The substitute advertisement 14 may be stored in the disk 18 unencrypted or encrypted.

The splicing system 10 typically substitutes the substitute advertisements 14 at the times signaled, described in more detail with reference to FIG. 3. When playing back the substitute advertisement 14, all the frames of the substitute advertisement 14 are typically rendered. However, in trick modes some of the frames may be skipped.

A channel change action by a viewer is typically possible at any time during a substituted advertisement avail and generally results in terminating any playback of the substitute advertisement(s) 14 and tuning to the requested live channel.

In review buffer playback or playback of a recorded broadcast program from the disk 18, the same substitute advertisement(s) 14 is typically shown as in live viewing of the same program(s). The substitute advertisement 14 is typically substituted at playback time. If the user pauses during the substitute advertisement 14, the splicing system 10 may show a freeze-frame of the substitute advertisement 14. If the viewer resumes playback after pause during the substitute advertisement 14, the splicing system 10 typically resumes playback of the substitute advertisement 14 from the pause position and where relevant, returns to review-buffer playback at the end of the last advertisement spot to be substituted in the advertisement avail. Rewind is typically possible in the substitute advertisement 14. During live-pause, fast forward in the substitute advertisement 14 is typically allowed to the extent that at the end of the advertisement avail, the live program 40 is not anticipated and the live advertisements 42 which are generally concealed are not shown.

The live stream 16 is typically demultiplexed by DEMUX1 and the substitute advertisement 14 by DEMUX2. Playback broadcast content is also typically demultiplexed by DEMUX2. In accordance with an alternative embodiment of the present invention, the live stream 16 and the substitute advertisement 14 may be demultiplexed using the same demultiplexer. In such a case the input of the demultiplexer is switched and not the input to the rate buffers 28, 30. In accordance with another alternative embodiment of the present invention, the playback broadcast content and the substitute advertisement 14 may use different demultiplexers.

The rate buffers 28, 30 are generally not flushed when the source of the rate buffers 28, 30 is switched.

Figure 3:
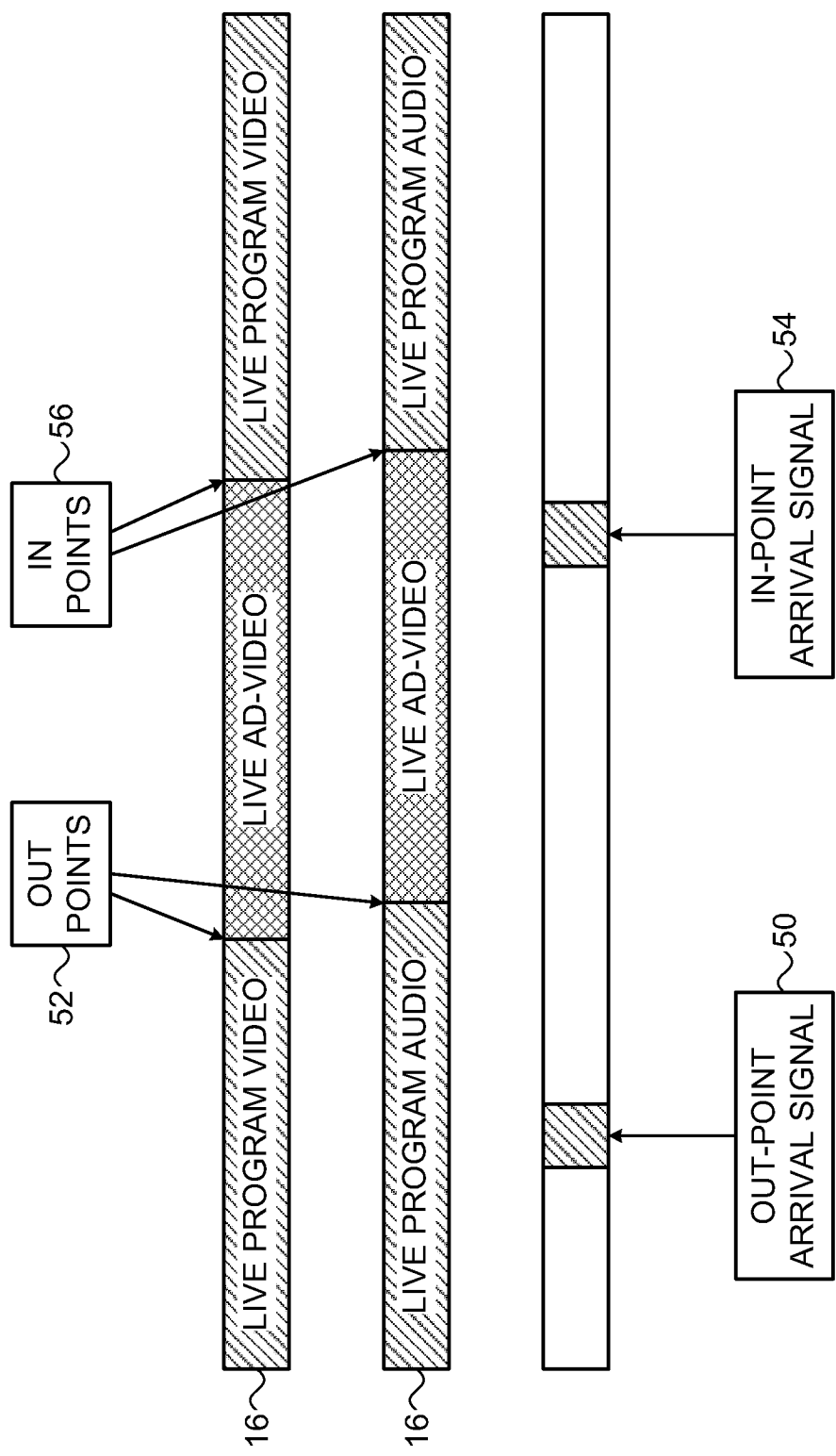
FIG. 3 is a partly pictorial, partly block diagram view showing the timeline for transitions between content in the system of FIG. 1.

Reference is now made to FIG. 3, which is a partly pictorial, partly block diagram view showing the timeline for transitions between content in the system 10 of FIG. 1.

The timeline of FIG. 3 illustrates that the user is viewing the live stream 16 (live or playback). An out-point arrival signal 50, included on a private packet ID (PID) within the tuned service, indicates that an advertisement substitution could occur at an out-point 52. The PTS of the out-point 52 and the duration of the advertisement break is signaled to the splicing system 10. For playback, the time offset of the out-point 52 within the playback is also known. When the rendering of the video and/or audio reaches the out-point 52, the rendering of the live stream 16 is terminated and playback of the substitute advertisement 14 (FIG. 1) begins from the disk 18 (FIG. 1). Towards the end of the advertisement break, there is optionally some extra signaling, an in-point arrival signal 54, to notify the splicing system 10 of the PTS of an in-point 56 in the live stream 16. For playback, the time offset of the in-point 56 within the playback is also known. The splicing system 10 rejoins the live stream 16 in time to decode and render the in-point 56.

The out-point arrival signal 50 and the in-point arrival signal 54 are broadcast in the live stream 16 sufficiently in advance for the splicing system 10 to act upon the signals 50, 54 and perform the advertisement substitution in a seamless manner. By way of a non-limiting example, the out-point arrival signal 50 may proceed the out-point 52 by four seconds or more.

The out-point arrival signal 50 typically conveys the PTS of the out-point 52 and the duration of the substitution. The out-point arrival signal 50 may also includes information about what content or type of content should be used as substitution content. Using the PTS of the out-point 52, duration, and the frame rate, the splicing system 10 is generally able to calculate the PTS of the in-point 56. Alternatively, the splicing system 10 may provide the in-point arrival signal 54 to signal the PTS of the in-point 56.

When recording a program with advertisement substitution, the splicing system 10 is typically operative to determine the location in the recording of the signaled in-point 56 and out-point 52.

For playback of a program in reverse direction, the in-points 56 become out-points, and vice versa.

The description with reference to FIGS. 4-7 describes transitioning from rendering the live stream 16 to rendering the substitute advertisement 14 from the disk 18.

Figure 4:
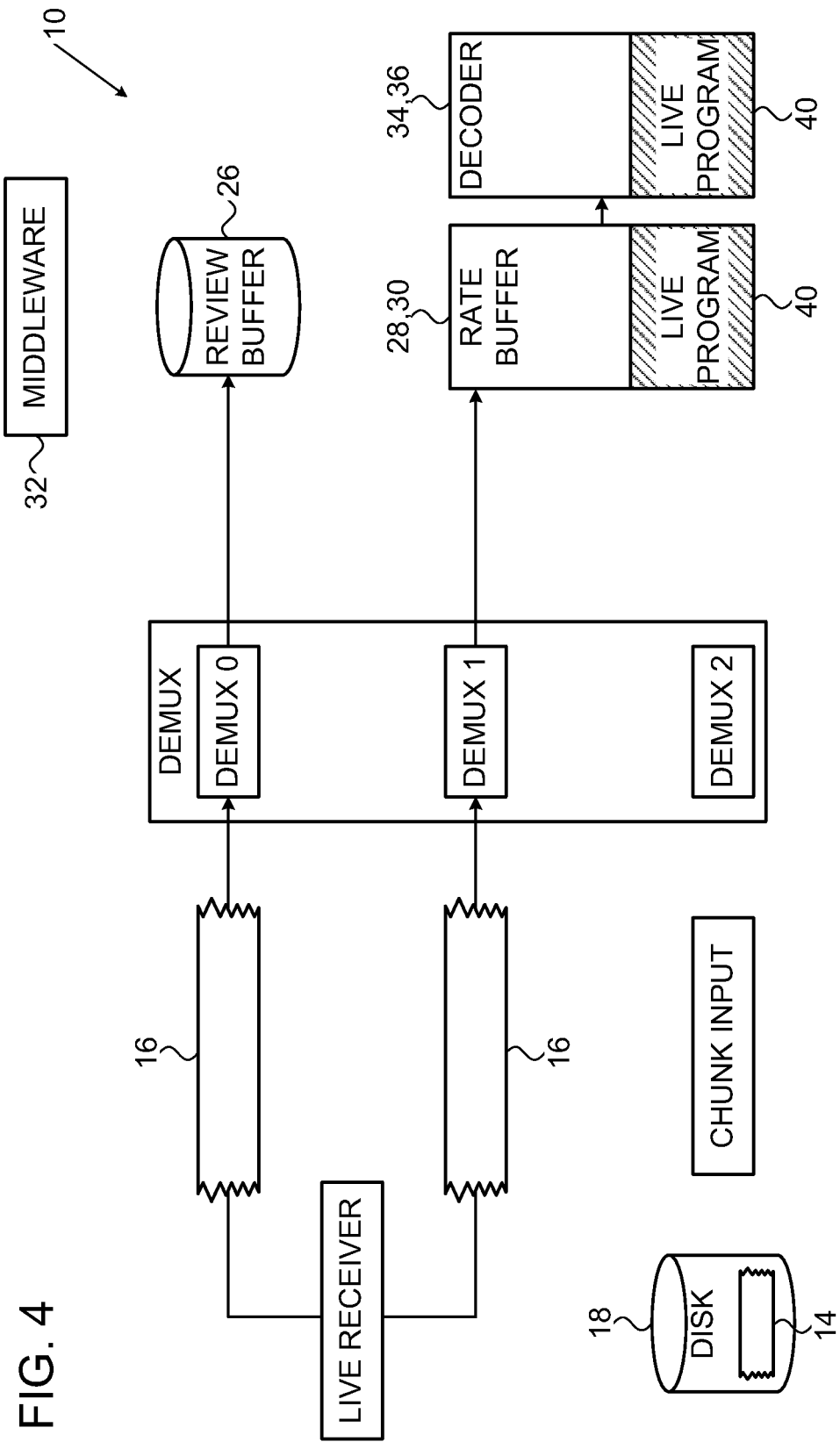
FIG. 4 is a partly pictorial, partly block diagram view of live rendering and review buffer recording prior to a live to disk transition in the system of FIG. 1.

Reference is now made to FIG. 4, which is a partly pictorial, partly block diagram view of live rendering and review buffer recording prior to a live to disk transition in the system 10 of FIG. 1.

FIG. 4 shows that the splicing system 10 is rendering the live program 40 of the live stream 16 and optionally recording the live stream 16 in the review buffer 26. Reference is also made to FIG. 3.

The splicing system 10 detects the out-point arrival signal 50 while tuned to the live stream 16. The identity of the advertisement opportunity is signaled to the splicing system 10, so that an appropriate substitute advertisement 14 can be determined.

The splicing system 10 detects the out-points 52 (in the audio and video stream) at which the splicing system 10 typically ceases rendering content from the live stream 16 and switches to rendering the substitute advertisement 14 from the disk 18. Drivers (not shown) of the decoders 34, 36 are operative to notify the middleware 32 when the out-points 52 are reached. In order to avoid decoder starvation (buffer under-run), the drivers are typically operative to notify the middleware 32 as soon as the packets at the out-points 52 enter the rate buffers 28, 30, and not wait for the packets to be decoded before notifying.

In general whether performing a live to disk, or a disk to live, or a disk to disk transition, the decoder drivers are operative to: detect when the splice point time stamp (in this case the out-point 52) enters the rate buffers 28, 30; and send a notification to the middleware 32 when the spice point time stamp enters the rate buffers 28, 30. The middleware 32 is operative to: receive the notification; and then based on the notification, switch from outputting the one audio/video sequence to outputting another audio/video sequence to the rate buffers 28, 30.

Figure 5:
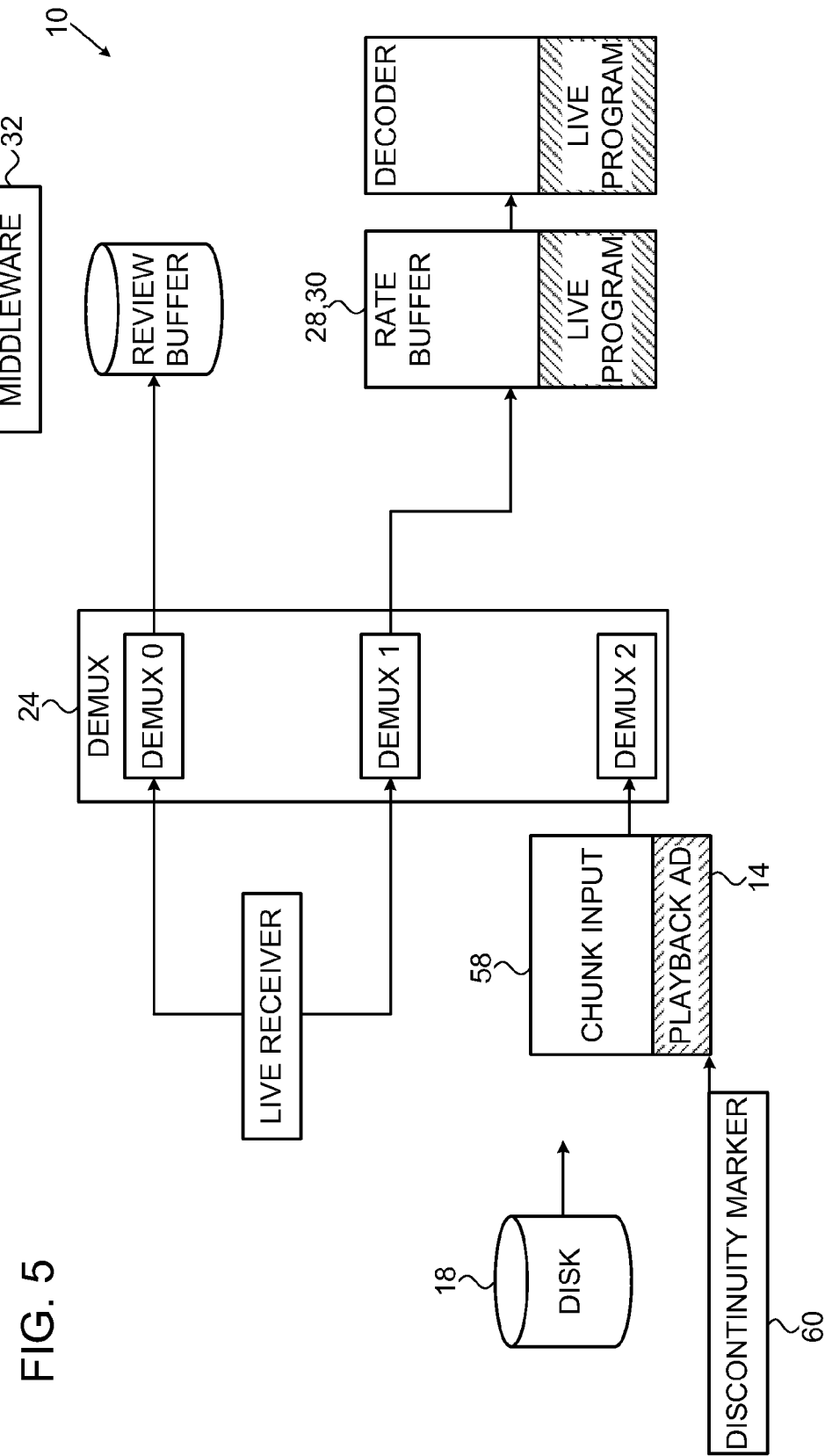
FIG. 5 is a partly pictorial, partly block diagram view showing preparation of a playback advertisement for demultiplexing prior to the live to disk transition in the system of FIG. 1.

Reference is now made to FIG. 5, which is a partly pictorial, partly block diagram view showing preparation of the substitute advertisement 14 for demultiplexing prior to the live to disk transition in the system 10 of FIG. 1.

After detecting the out-point arrival signal 50 (FIG. 3), the middleware 32 prepares the substitute advertisement 14 for rendering by reading some chunks of the substitute advertisement 14 from the disk 18 and writing the chunks to a chunk input buffer 58 (also known as a demultiplexer input buffer) of DEMUX2 which is not yet outputting to the rate buffers 28, 30. The first chunk of data of the substitute advertisement 14 written to the chunk input buffer 58 typically includes a discontinuity marker 60, followed by the start of the substitute advertisement 14. The discontinuity marker 60 is a marker injected into the demultiplexer arrangement 24 used to convey a discontinuity between the substitute advertisement 14 that has been injected into the demultiplexer arrangement 24 and other content that is prior to the marker 60. Alternatively, the discontinuity marker 60 may be injected into the rate buffers 28, 30 at the appropriate time.

Figure 6:
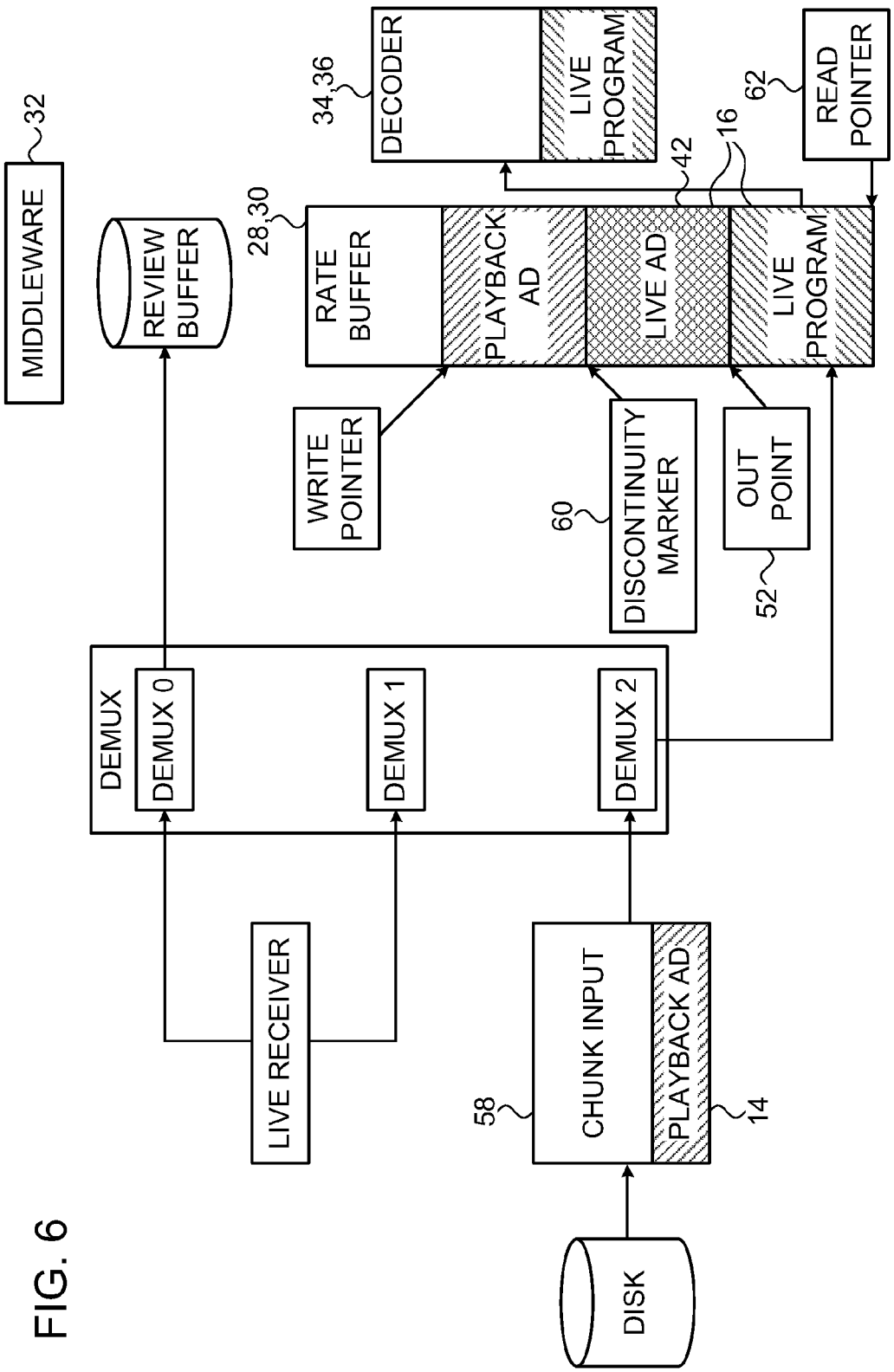
FIG. 6 is a partly pictorial, partly block diagram view showing the state of a rate buffer after the live to disk transition in the system of FIG. 1.

Reference is now made to FIG. 6, which is a partly pictorial, partly block diagram view showing the state of the rate buffers 28, 30 after the live to disk transition in the system 10 of FIG. 1.

When the middleware 32 receives notification that the out-point 52 has arrived in the rate buffers 28, 30, DEMUX1 discontinues outputting data to the rate buffers 28, 30 and DEMUX2 starts outputting to the rate buffers 28, 30 for playback to begin. The relationship between the video and audio out-points 52 is described in more detail with reference to FIG. 7.

The content of the rate buffers 28, 30 and the chunk input buffer 58 are generally not impacted by the switching of the source of the rate buffers 28, 30.

Then, the middleware 32 typically instructs DEMUX2 to commence consuming the data from the chunk input buffer 58.

Depending on the latency in performing the switch from the live stream 16 to the substitute advertisement 14, and whether switching from the live stream 16 is delayed to accommodate the arrival of audio frames, some of the content from the live advertisement(s) 42 may be processed by DEMUX1 before DEMUX1 stops outputting to the rate buffers 28, 30. Therefore, the rate buffers 28, 30 typically include data from the live advertisement(s) 42 that is not required to be decoded or displayed.

The decoders 34, 36 typically decode from a current read pointer 62 until the out-point 52 signaled by the middleware 32.

The middleware 32 generally instructs the rate buffers 28, 30 to discard all data from the signaled out-point 52 until the discontinuity marker 60.

The middleware 32 typically adjusts the system time clock (STC) (not shown) to accommodate for the difference in value between the PTS of the live stream 16 and the PTS of the substitute advertisement 14.

The decoders 34, 36 typically decode from the discontinuity marker 60 onwards in the substitute advertisement 14.

It should be noted that the data from the signaled out-point 52 until the discontinuity marker 60 may be discarded at any suitable time.

Figure 7:
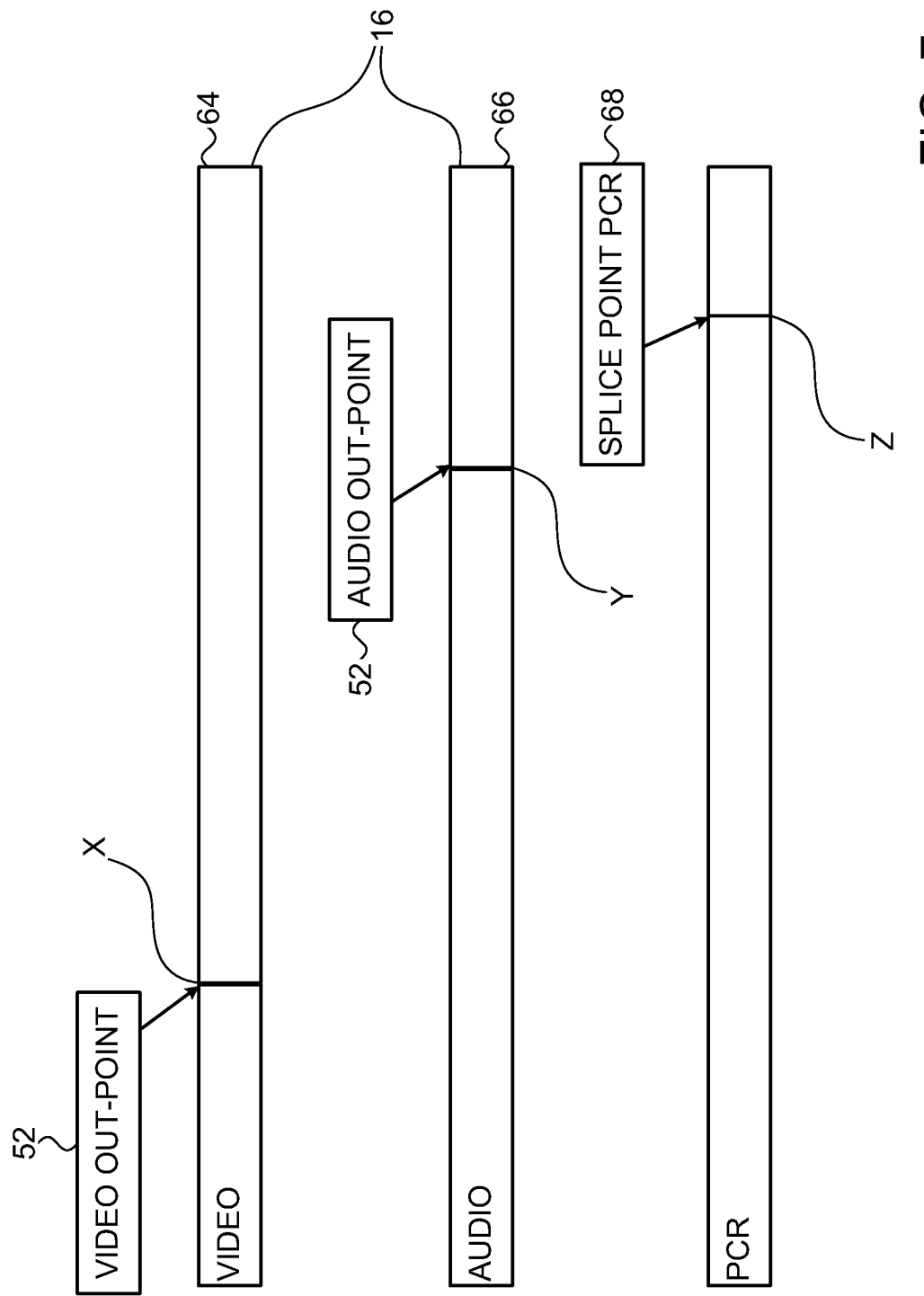
FIG. 7 is a partly pictorial, partly block diagram view of a timeline during splicing out in the system of FIG. 1.

Reference is now made to FIG. 7, which is a partly pictorial, partly block diagram view of a timeline during splicing out in the system 10 of FIG. 1.

When switching from the live stream 16 to the substitute advertisement 14 (FIG. 1), there are factors that influence the timing of the switch, as follows.

The earlier the out-point 52 arrival is detected and notified, the more time the middleware 32 has to perform the switch. If the out-point 52 is only notified when the packet of the out-point 52 is decoded (or worse when it is rendered), then video decoder starvation is likely to occur.

If the PTS is notified prior to the decoding stage, then the difference between the PTS and the program clock reference (PCR) may also be significant. A greater difference provides more time for the middleware 32 (FIG. 1) to perform the switch. The magnitude of the difference may vary depending on the stream encoding type and GOP size. Typical values for the difference for video are between 200 ms and 800 ms, by way of example only, although the upper limit may increase to values in the order of seconds.

Another factor influencing the timing of the switch is component-level splice versus program-level splice. Consider a typical service with a video component 64 and an audio component 66, as shown in FIG. 7. Each component 64, 66 includes the out-point 52 expressed as a PTS value, which defines the last video frame and the last audio sample to be rendered from components 64, 66, respectively. The presence of the video out-point 52 in the stream is labeled as x and the presence of the audio out-point 52 in the stream is labeled as y. The PCR in the stream reaches the PTS value of the out-point 52 at time z, a splice point PCR 68. Now, the out-point 52 for the audio y lags that of the video x. Typical values for y-x are between a hundred milliseconds to a few seconds on a given service, depending on the type of video and audio encoding. The proximity of the audio out-point y is close to the actual PCR splice point z. Typical values for z-y are between 50 and 150 milliseconds.

One possible implementation is to splice out of the live stream 16 as soon as the video out-point x is detected, yielding the best possible video splice, but may typically cause the audio to be lost in the period prior to the splice point (the audio carried between x and y). The duration of the audio loss is dependent on the difference between the audio and video out-points.

An alternative method is to wait for the audio and video out-points 52 to be notified (both x and y) before splicing out of the live stream 16. However, while ensuring that all the audio is rendered leading up to the splice point, the video splice is likely to be impacted including starvation of the video decoder 36 (FIG. 1).

Another approach is to splice out of the live stream 16 some time between the arrival of the video out-point x and the audio out-point y. The optimal time is typically based on empirical testing which yields the best overall splice experience.

Figure 8:
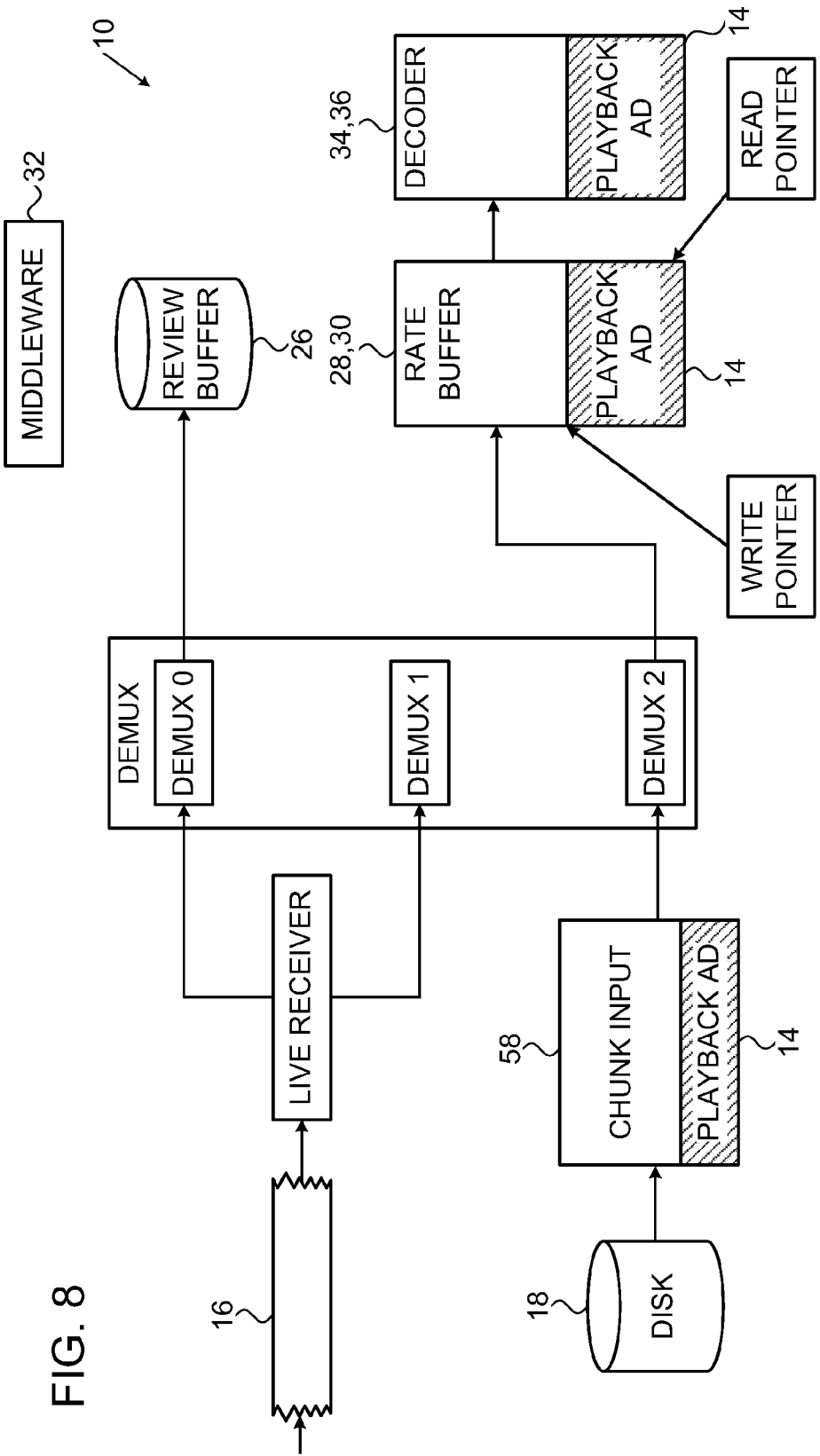
FIG. 8 is a partly pictorial, partly block diagram view showing rendering of the playback advertisement prior to a disk to live transition in the system of FIG. 1.

Reference is now made to FIG. 8, which is a partly pictorial, partly block diagram view showing rendering of the playback advertisement 14 prior to a disk to live transition in the system 10 of FIG. 1.

The viewer is viewing the substitute advertisement 14 being played back from the disk 18 using DEMUX2. The review buffer 26 may be recording in the background, using DEMUX0. In addition, the filtering of data, for example, but not limited to, program specific information (PSI), service information (SI), entitlement control message (ECM), entitlement management message (EMM), interactive application (iApp) data from the live stream 16 is typically performed on DEMUX1 so that PSI, SI, interactive application data, ECMs and EMMs are available for use even while the viewer is viewing the substitute advertisement 14. The audio and video of the live stream 16 is not currently being filtered by DEMUX1, while DEMUX2 is still outputting to the rate buffers 28, 30.

The data of the substitute advertisement 14 in the chunk input buffer 58 is consumed by DEMUX2 at a very high bit rate, while the data in the rate buffers 28, 30 is consumed by the decoders 34, 36 at a lower rate (which satisfies the rate of decoding). Thus, once the last chunk of the substitute advertisement 14 is consumed by DEMUX2, DEMUX1 starts filtering the audio and video of the live stream 16 and outputs to the rate buffers 28, 30, even though the decoders 34, 36 and display manager (not shown) are still involved with decoding and rendering the end of the substitute advertisement 14. In other words, sometime prior to the in-point 56 of FIG. 3, all the substitute advertisement 14 data has been consumed by DEMUX2. The exact timing is typically a function of the chipset, the type of content being played, and the play speed. The time between the completion of demultiplexing the substitute advertisement 14 and the time that the last frame of the substitute advertisement 14 is rendered is discussed in more detail with reference to FIG. 9.

Figure 9:
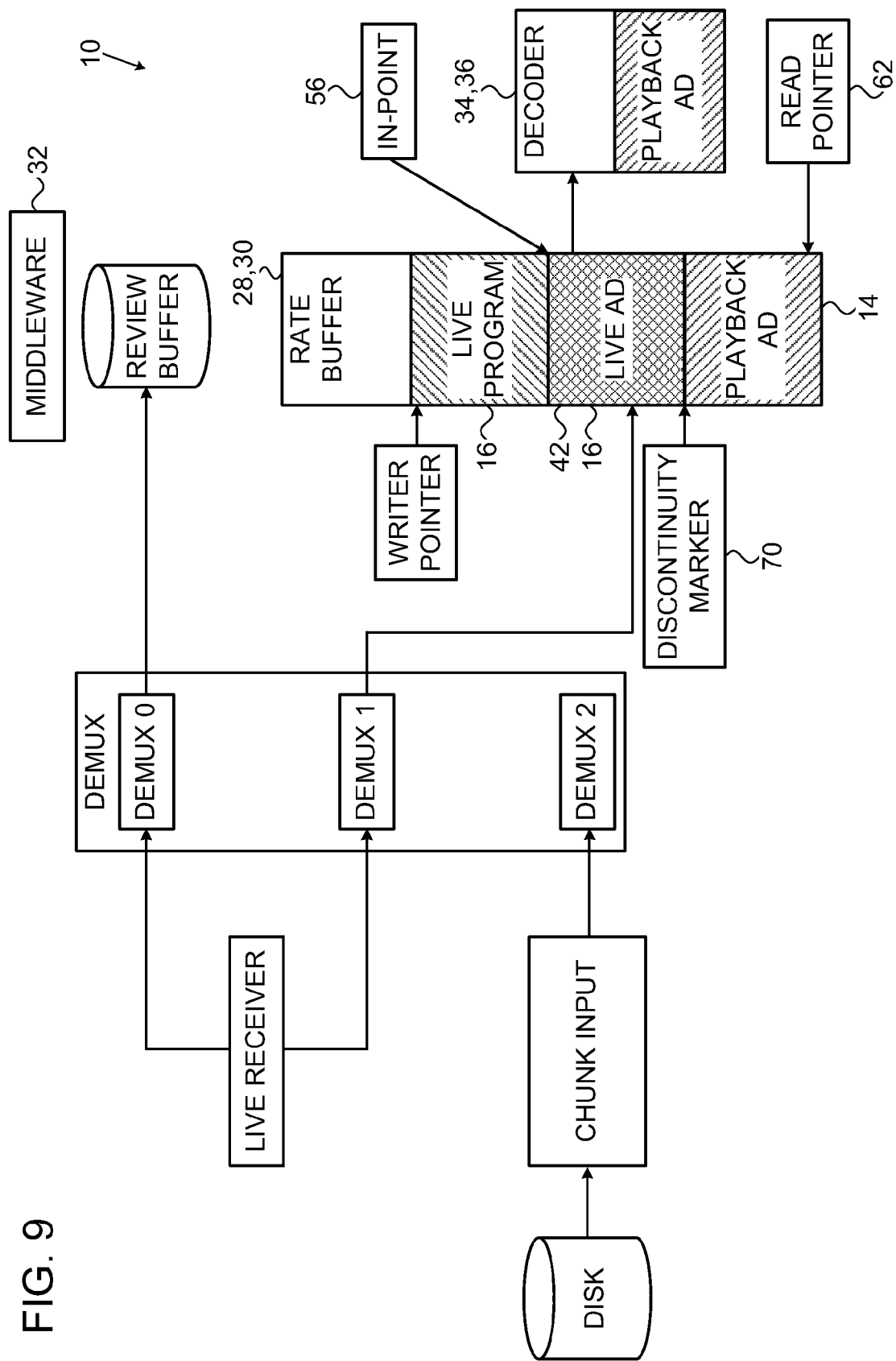
FIG. 9 is a partly pictorial, partly block diagram view showing the state of the rate buffer after the disk to live transition in the system of FIG. 1.

Reference is now made to FIG. 9, which is a partly pictorial, partly block diagram view showing the state of the rate buffers 28, 30 after the disk to live transition in the system 10 of FIG. 1.

The middleware 32 appends a discontinuity marker 70 into the DEMUX2 input at the end of the substitute advertisement 14.

Once all substitute advertisement 14 data has been consumed by DEMUX2, the rate buffers 28, 30 are ready to receive output from DEMUX1.

Since ECMs are continuously filtered on DEMUX1, the control words (CWs) required for descrambling the live stream 16 are continuously generated and thus immediately available.

The middleware 32 informs the decoders 34, 36 of the PTS value of in-point 56.

Filtering of the live stream 16 commences prior to the arrival of the in-point 56. It is therefore expected that some content from the live advertisement(s) 42 will be filtered by DEMUX1 prior to demultiplexing the in-point 56 and accumulate in the rate buffers 28, 30. The rate buffers 28, 30 need to be sufficiently depleted at the switch back to live to avoid a buffer overflow, as described above.

The decoders 34, 36 decode from the current read pointer 62 until the discontinuity marker 70. The middleware 32 typically adjusts the system time clock (STC) (not shown) based on the difference in value between the PTS of the live stream 16 and the PTS of the substitute advertisement 14 included in the discontinuity marker 70. The middleware 32 instructs the rate buffers 28, 30 to discard the data from the discontinuity marker 70 until the PTS of the in-point 56. Then, the decoders 34, 36 begin decoding, and the display managers rendering, from the in-point 56. It should be noted that the data from the discontinuity marker 70 until the PTS of the in-point 56 may be discarded at any suitable time.

The return to the live stream 16 is generally performed sufficiently early, such that it is possible to demultiplex, decrypt and render the live stream 16 for output from the defined in-point 56. The maximum value of the PTS-PCR difference found in the video stream typically determines the maximum time that the splicing system 10 must rejoin the live stream 16 prior to the expected in-point 56.

Since the same rate buffers 28, 30 are used for the live stream 16 and for the substitute advertisement 14, the demultiplexing of the substitute advertisement 14 from the disk 18 is typically performed sufficiently early such that the rate buffers 28, 30 are made available to receive output from the live stream 16 and to comply with the constraints described above.

Figure 10:
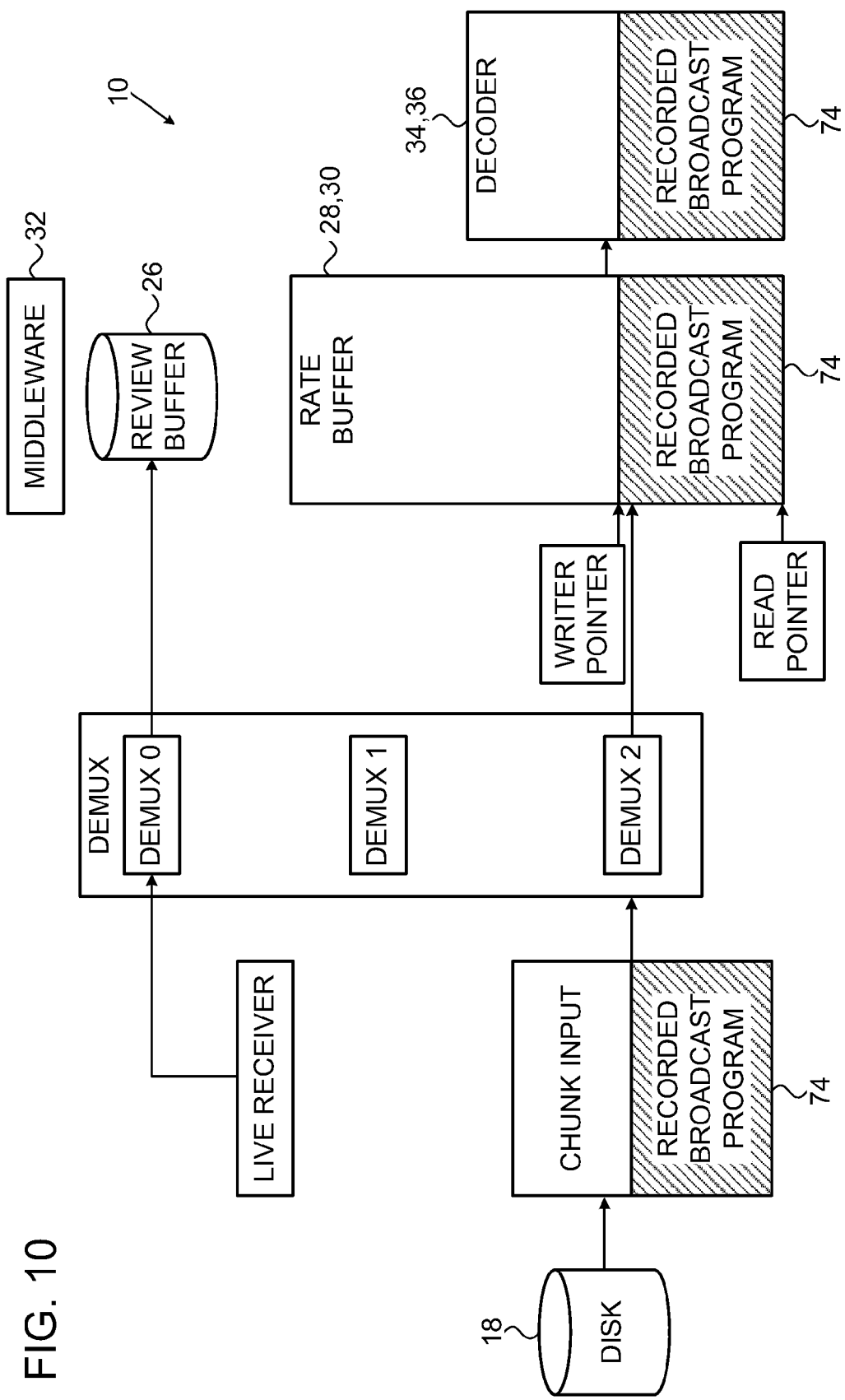
FIG. 10 is a partly pictorial, partly block diagram view showing rendering of recorded broadcast content prior to a disk to disk transition in the system of FIG. 1.

Reference is now made to FIG. 10, which is a partly pictorial, partly block diagram view showing rendering of a recorded broadcast program 74 prior to a disk to disk transition in the system 10 of FIG. 1.

The viewer is viewing the recorded broadcast program 74 from the disk 18 using DEMUX2. The review buffer 26 may be recording in the background using DEMUX0. The driver of the decoders 34, 36 typically notify the middleware 32 when video and audio with the PTS of the out-point 52 (FIG. 3) is reached. In order to ensure a clean splice, the drivers typically notify the middleware 32 as soon as the packet with the PTS of the out-point 52 enters the rate buffers 28, 30 and not wait for the packet with the PTS of the out-point 52 to be decoded before notifying the middleware 32.

Figure 11:
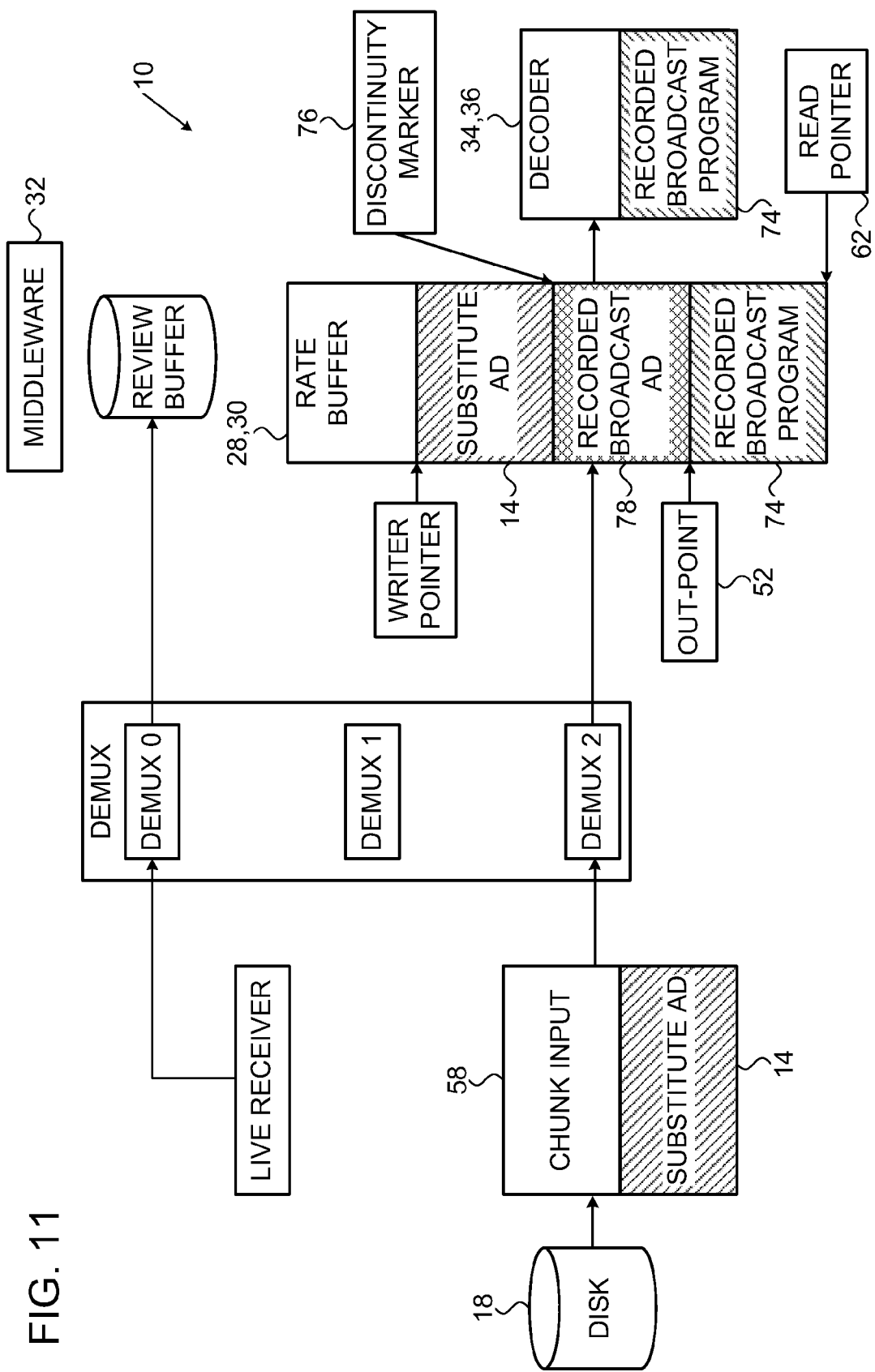
FIG. 11 is a partly pictorial, partly block diagram view showing the state of the rate buffer after the disk to disk transition in the system of FIG. 1.

Reference is now made to FIG. 11, which is a partly pictorial, partly block diagram view showing the state of the rate buffers 28, 30 after the disk to disk transition in the system 10 of FIG. 1.

When the middleware 32 receives notification that the out-point 52 has arrived in the rate buffer 28, 30, streaming of the recorded broadcast program 74 is no longer made into the chunk input buffer 58. DEMUX2 is reconfigured for playback of the substitute advertisement 14 from the disk 18. The chunk input buffer 58 is primed with the start of the substitute advertisement 14, which is preceded by a discontinuity marker 76. The middleware 32 instructs DEMUX2 to begin consuming the data in the chunk input buffer 58.

Since there is typically some latency in receiving the notification of the out-point 52 and stopping the playback, it may be expected that part of a recorded broadcast advertisement 78 recorded with the recorded broadcast program 74 is processed by DEMUX2 before the playback is stopped. Therefore, the rate buffers 28, 30 may include data from the recorded broadcast advertisement 78 that is not required to be decoded or displayed.

The middleware 32 signals the decoders 34, 36 to decode from the current read pointer 62 until the out-point 52. The middleware 32 instructs the rate buffers 28, 30 to discard all data from the out-point 52 until the discontinuity marker 76. The middleware 32 typically adjusts the STC to accommodate for the difference in value between the PTS of the recorded broadcast program 74 and the PTS of the substitute advertisement 14. The decoders 34, 36 begin decoding from the discontinuity marker 76 onwards. It should be noted that the data from the out-point 52 until the discontinuity marker 76 may be discarded at any suitable time.

Figure 12:
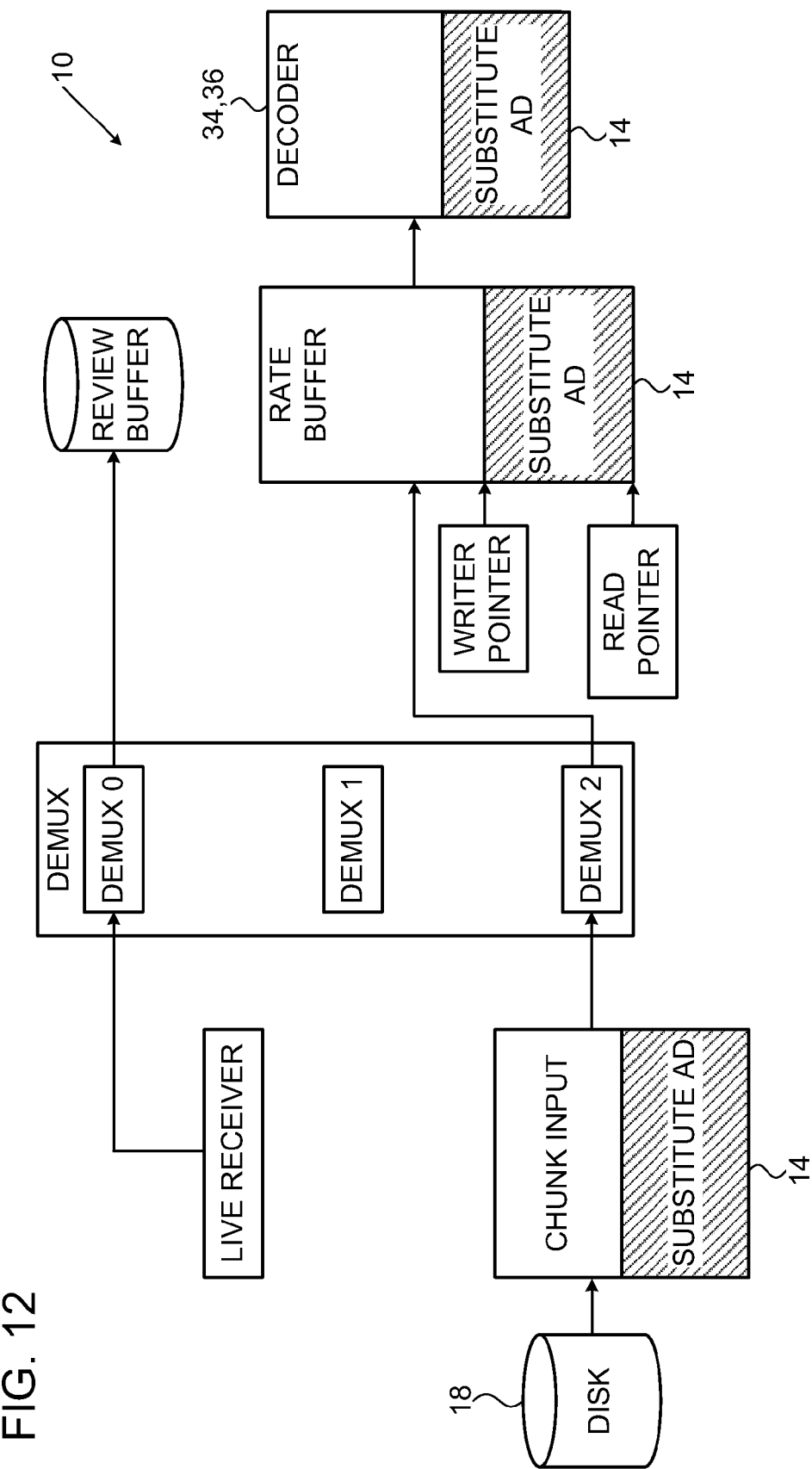
FIG. 12 is a partly pictorial, partly block diagram view showing rendering of a substitute advertisement prior to a second disk to disk transition in the system of FIG. 1.

Reference is now made to FIG. 12, which is a partly pictorial, partly block diagram view showing rendering of the substitute advertisement 14 prior to a second disk to disk transition in the system 10 of FIG. 1.

The substitute advertisement 14 is being played back from the disk 18 using DEMUX2. When the last chunk of the substitute advertisement 14 is consumed by DEMUX2, DEMUX2 becomes available even though the decoders 34, 36 and the display manager (not shown) are still involved with decoding and rendering the last frames of the substitute advertisement 14.

Figure 13:
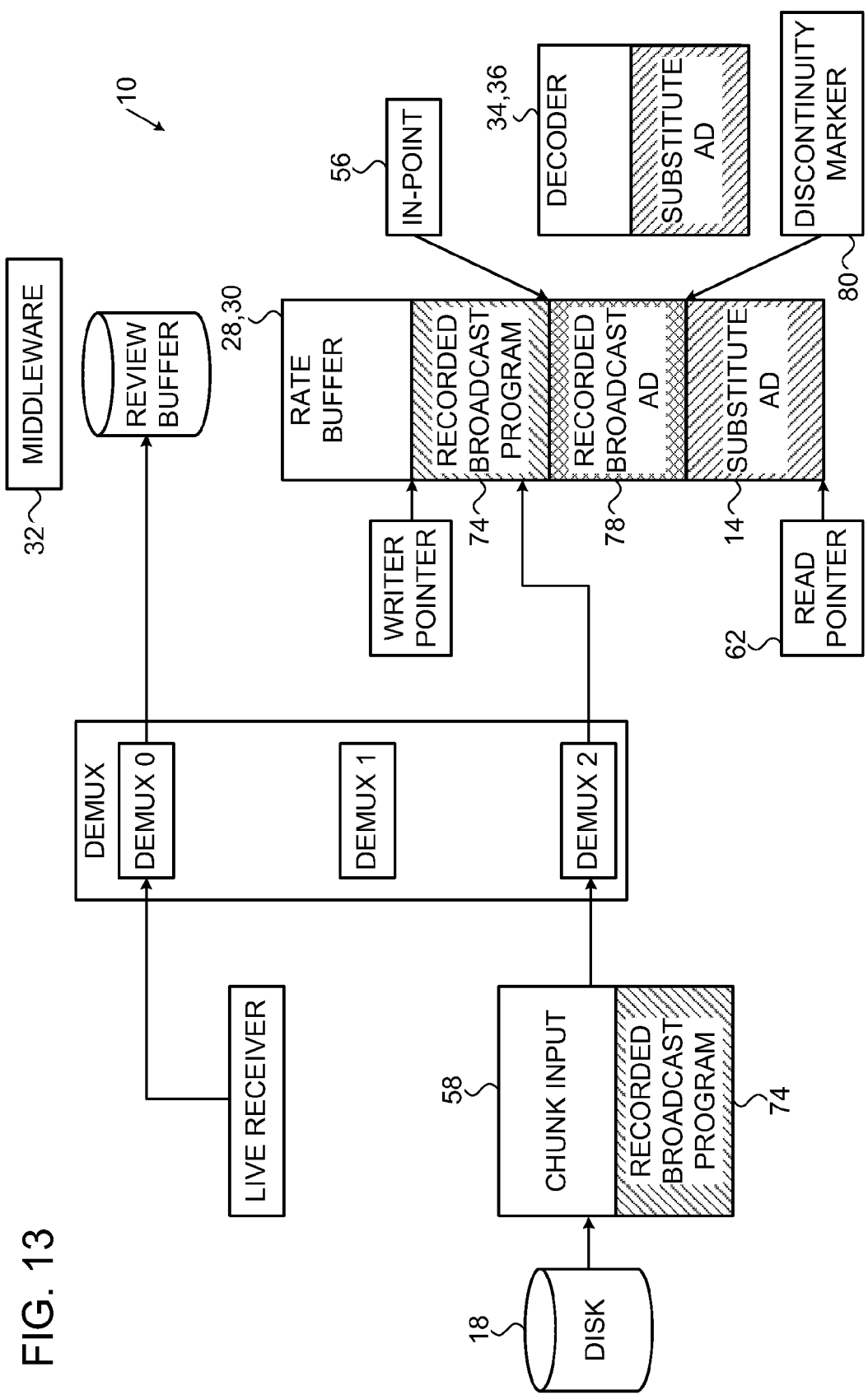
FIG. 13 is a partly pictorial, partly block diagram view showing the state of the rate buffer after the second disk to disk transition in the system of FIG. 1.

Reference is now made to FIG. 13, which is a partly pictorial, partly block diagram view showing the state of the rate buffers 28, 30 after the second disk to disk transition in the system 10 of FIG. 1.

DEMUX2 is reconfigured for playback of the recorded broadcast program 74 from the disk 18. CWs required for decrypting the recorded broadcast program 74 are applied. A discontinuity marker 80 is inserted by the middleware 32 into DEMUX2 input. The chunk input buffer 58 is primed with the recorded broadcast program 74, from the approximate point from where the playback should resume. The middleware 32 instructs DEMUX2 to begin consuming the data in the chunk input buffer 58.

It is generally not practical that the first chunk of recorded broadcast program 74 written to the chunk input buffer 58 is aligned with the RAP in which the PTS of the in-point 56 appears. Instead, it can be expected that the first chunk may include data that precedes the first GOP to decode and render and thus the rate buffers 28, 30 may include data from the playback that is not required to be decoded or displayed (for example, the end of the recorded broadcast advertisement 78).

The decoders 34, 36 decode from the current read pointer 62 until the discontinuity marker 80. The middleware 32 typically adjusts the STC to accommodate for the difference in value between the PTS of the recorded broadcast program 74 and the PTS of the substitute advertisement 14 included in the discontinuity marker 80. The middleware 32 typically instructs the rate buffers 28, 30 to discard the data from the discontinuity marker 80 until the in-point 56.

The decoding and rendering is then continued from the in-point 56. The data from the discontinuity marker 80 until the in-point 56 may be discarded at any suitable time.

Reference is now made to FIG. 14, which is a partly pictorial, partly block diagram view of live video frames 82 in the system 10 of FIG. 1.

The typical stream format of the live stream 16 is described below. However, it will be appreciated by those ordinarily skilled in the art that any suitable stream format may be used.

For better system performance there should be no PCR discontinuity from the time that the advertisement avail is signaled until the end of the advertisement avail. Elementary streams (ESs) in a service may be clear or scrambled/encrypted. The instantaneous decoding refresh (IDR) access unit (not shown) in the video ES and the audio frame in the audio ES which follows the intended splice point specified in the ANSI/SCTE 35 [1] splice_info_section( ) (and which may be either a splice from network or a splice into the network) is typically a packetized elementary stream (PES) packet, which in turn generally begins a TS packet. The TS packet typically carries an adaptation field with a random_access_indicator and an elementary_stream_priority_indicator both set to '1'. The PES packet carrying the IDR access unit (H264) or I-Frame (MPEG 2) typically includes a PTS. The MPEG Systems specification enables the announcement of a splice point in the transport domain by setting the splicing_point_flag and including a splice_countdown field within the adaptation field of the transport packet. Within the splicing system 10, the splice_countdown field is generally set to "0x00" for the transport stream packet of the Video PID that occurs immediately before the packet containing the start of a GOP that represents the splice point.

In an MPEG-2 and MPEG-4 video ES, the out-point 52 in the live stream 16 is typically the first picture of the live stream 16 that should not be displayed. The in-point 56 in the live stream 16 is typically the first picture of the live stream 16 that should be displayed when returning to the live stream 16. The in-point 56 in the live stream is typically at a RAP in the stream.

In an MPEG-1 Layer 2 audio ES, the audio levels typically ramp down to zero around splice points such that an audio mute of, say 300 milliseconds by way of example only, precedes the video out-point 52 in the live stream 16 and follows the video in-point 56 in the live stream 16.

In an AC-3 audio ES, AC-3 generally does not impose restrictions on the audio in the broadcast.

Reference is now made to FIG. 15, which is a partly pictorial, partly block diagram view of a plurality of recorded video frames 84 in the system 10 of FIG. 1.

The typical stream format of the recorded substitute advertisements 14 is now described below. However, it will be appreciated by those ordinarily skilled in the art that any suitable stream format may be used.

Each substitute advertisement 14 typically starts with a video RAP and a closed GOP. Each substitute advertisement 14 is generally a self-contained recording. The substitute advertisements 14 may be encrypted or in the clear. The recording of each substitute advertisement 14 typically starts with the first frame 84 of the advertisement 14, in other words without a leader. The recorded substitute advertisements 14 may include DVB subtitles, teletext subtitles, or closed captions by way of example only.

For enhanced splicing performance, the substitute advertisement 14 stored in the disk 18 (FIG. 1) typically has similar encoding characteristics to that of the live stream 16 that the substitute advertisement 14 is substituting.

It will be appreciated by those ordinarily skilled in the art that some broadcasters may prefer not to incur the cost of broadcasting and storing multiple advertisement instances, in which case the splicing system 10 may need to transition between different advertisements stored in the same file possibly leading to non-optimal splicing and possibly with the observation of video and/or audio inconsistencies.

Adjacent content of different scan types (progressive or interlaced) may be rendered successively. There is no requirement for adjacent content to use the same PIDs. Adjacent content is generally of the same video encoding type, for example, but not limited to, both are MPEG-2 or both are H.264-AVC. Adjacent content typically has the same aspect ratios (4:3 or 16:9) and video resolution. However, it will be appreciated by those ordinarily skilled in the art that adjacent content may have different video encoding types, aspect ratios, scan modes and video resolution.

Adjacent content typically has the same audio encoding type, for example, but not limited to, both are MPEG-1 Layer 2 or both are AC-3. However, it will be appreciated by those ordinarily skilled in the art that different audio encoding types may be used.

For AC-3 audio, adjacent audio content typically has: the same number of channels (5.1 versus stereo), the same data rate, and same sampling rate. However, it will be appreciated by those ordinarily skilled in the art that adjacent audio content may have different number of channels, data rates and sampling rates.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A system for switching from a first audio/video sequence to a live audio/video sequence, the live audio/video sequence including a splice point time stamp, the system comprising a plurality of operationally connected elements including:
   a disk to store content therein including the first audio/video sequence;
   a live receiver to receive the live audio/video sequence;
   a buffer;
   a demultiplexer arrangement to demultiplex, at least some of the first audio/video sequence from the disk for storage in the buffer and then demultiplex at least some of the live audio/video sequence from the live receiver for storage in the buffer; and
   a decoder to decode the demultiplexed audio/video stored in the buffer including first decoding the first audio/video sequence and then decoding the live audio/video sequence from the splice point time stamp,
   wherein:
      the demultiplexer arrangement is operative to push the first audio/video sequence faster than real-time, from the disk, through the demultiplexer arrangement and into the buffer so that the demultiplexing of the live audio/video sequence into the buffer can commence a number of frames prior to the splice point time stamp while the first audio/video sequence is being decoded from the buffer by the decoder;
      while the demultiplexer arrangement is pushing the first audio/video sequence faster than real-time, from the disk, through the demultiplexer arrangement and into the buffer, the first audio/video sequence is not being pushed through the decoder faster than real-time.

2. The system according to claim 1, wherein:
   the demultiplexed audio/video of the live audio/video sequence includes unwanted data, the unwanted data being from the number of frames prior to the splice point time stamp until before the splice point time stamp; and
   the buffer is operative to discard the unwanted data of the live audio/video sequence so that the decoder does not receive the unwanted data for decoding.

3. The system according to claim 1, further comprising:
   a pre-filter disposed between the demultiplexer arrangement and the buffer, the pre-filter being operative to receive, from the demultiplexer arrangement, the demultiplexed audio/video of the first audio/video sequence and the live audio/video sequence, the demultiplexed audio/video of the live audio/video sequence including unwanted data, the unwanted data being from the number of frames prior to the splice point time stamp until before the splice point time stamp, and wherein the buffer is operative to receive for storage therein, the demultiplexed audio/video from the pre-filter including demultiplexed audio/video of the first audio/video sequence and the live audio/video sequence excluding the unwanted data filtered out by the pre-filter.

4. A method for switching from a first audio/video sequence to a live audio/video sequence, the live audio/video sequence including a splice point time stamp, the method comprising:
   demultiplexing at least some of the first audio/video sequence from a disk for storage in a buffer and then demultiplexing at least some of the live audio/video sequence from a live receiver for storage in the buffer;
   decoding the first audio/video sequence from the buffer; and then
   decoding the live audio/video sequence, from the buffer, from the splice point time stamp,
   wherein:
      the demultiplexing of the first audio/video sequence from the disk to the buffer is faster than real-time so that the demultiplexing of the live audio/video sequence into the buffer can commence a number of frames prior to the splice point time stamp while the first audio/video sequence is being decoded from the buffer;
      while the first audio/video sequence is being demultiplexed faster than real-time, from the disk and into the buffer, the first audio/video sequence is not being pushed through decoding faster than real-time.

5. The method according to claim 4, wherein the decoding seamlessly splices between decoding of the first audio/video sequence and the live audio/video sequence such that there will be no noticeable listening/viewing gap between the first audio/video sequence and the live audio/video sequence.

6. A system for switching from a first audio/video sequence to a live audio/video sequence, the live audio/video sequence including a splice point time stamp, the system comprising a plurality of operationally connected elements including:

means for storing content therein including the first audio/video sequence;

means for receiving the live audio/video sequence;

means for buffering;

means for demultiplexing, at least some of the first audio/video sequence from the means for storing for storage in the means for buffering and then demultiplexing at least some of the live audio/video sequence from the means for receiving for storage in the means for buffering; and means for decoding the demultiplexed audio/video stored in the means for buffering including first decoding the first audio/video sequence and then decoding the live audio/video sequence from the splice point time stamp, wherein the means for demultiplexing is operative to push the first audio/video sequence faster than real-time, from the means for storing, through the means for demultiplexing and into the means for buffering so that the demultiplexing of the second audio/video sequence into the means for buffering can commence a number of frames prior to the splice point time stamp while the first audio/video sequence is being decoded from the means for buffering and wherein while the means for demultiplexing is pushing the first audio/video sequence faster than real-time from the disk through the means for demultiplexing and into the means for buffering, the first audio/video sequence is not being pushed through the means for decoding faster than real-time.

\* \* \* \* \*